United States Patent [19]

Ali

[11] Patent Number: 4,557,973

[45] Date of Patent: Dec. 10, 1985

[54] FIRE RESISTANT GYPSUM BOARD CONTAINING MINERAL WOOL FIBERS AND METHOD

[75] Inventor: Mohammad H. Ali, Chicago, Ill.

[73] Assignee: United States Gypsum Company, Chicago, Ill.

[21] Appl. No.: 566,327

[22] Filed: Dec. 28, 1983

[51] Int. Cl.[4] .......................... B05D 3/12; B05D 7/00; B32B 5/16; B32B 9/00

[52] U.S. Cl. ........................................ 428/404; 156/39; 156/42; 427/215; 427/242; 428/406; 501/36; 501/123

[58] Field of Search ................ 427/215, 242; 428/404, 428/406; 501/36, 123; 156/39, 42; 162/128

[56] References Cited

U.S. PATENT DOCUMENTS

| | | | |
|---|---|---|---|
| 2,526,066 | 10/1956 | Croce | 106/110 |
| 2,681,863 | 6/1954 | Croce et al. | 106/109 |
| 2,744,022 | 5/1956 | Croce et al. | 106/110 |
| 2,803,575 | 8/1957 | Riddell et al. | 154/88 |
| 2,853,394 | 9/1958 | Riddell et al. | 106/114 |
| 3,454,456 | 7/1969 | Willey | 161/162 |
| 3,513,009 | 5/1970 | Sauer et al. | 118/120 X |
| 3,562,097 | 2/1971 | von Hazmburg | 162/129 |
| 3,616,173 | 10/1971 | Green et al. | 156/39 X |
| 4,090,882 | 5/1978 | Rauschenfels | 501/36 |
| 4,405,723 | 9/1983 | Kainzner et al. | 501/36 |

FOREIGN PATENT DOCUMENTS

WO83/00369  7/1982  PCT Int'l Appl. ................ 501/36

*Primary Examiner*—Michael R. Lusignan
*Attorney, Agent, or Firm*—Kenneth E. Roberts; Robert M. Didrick; Robert H. Robinson

[57] ABSTRACT

Blown mineral wool fibers are introduced into slurries (such as gypsum board core formulations and steel column fireproofing plaster formulations) by first blending and coating the blown mineral wool with a powdered calcium sulfate to produce a light, open nodulated effect. When mixed into aqueous calcined gypsum slurries, the nodules open up, thoroughly dispersing the mineral wool—calcium sulfate blend in the aqueous slurry and contributing fire resistant properties to the set gypsum product.

27 Claims, 1 Drawing Figure

FIRE RESISTANT GYPSUM BOARD CONTAINING MINERAL WOOL FIBERS AND METHOD

BACKGROUND OF THE INVENTION

1. Field of the Invention

This invention relates to paper covered gypsum board and its manufacture. More particularly, it relates to an improved gypsum board having increased resistance to fire in which there is incorporated mineral wool fibers.

As is well known, gypsum board comprising a cast gypsum core and cover sheets of paper or the like is widely used in building construction as, for example, gypsum wallboard, ceiling panels, lath and the like. In manufacturing such board, a water-stucco slurry fed from a mixer is spread over the face cover sheet and a back cover sheet applied thereover before the slurry has set. The set board is then cut to desired size and dried in a kiln. In use, the board is applied by means of clips, nails, screws or adhesives.

As the usage of such boards has expanded, specialty uses have placed a premium on certain properties. Specifically, fire ratings are required for numerous uses. When exposed to the heat and flames of a fire, the paper cover sheets first burn off the core. The cast gypsum core, predominantly calcium sulfate dihydrate, calcines with the gypsum giving up its chemically combined water (about 21% by weight of the gypsum). The water is slowly released as steam, effectively retarding heat transmission and disintegration of the board for a time as the gypsum is calcined. As the gypsum calcines it loses its inherent set gypsum strength. From studies of the actions of gypsum board when exposed to a fire, such as in a laboratory fire test, it has been generally evident that there is a substantial shrinkage of the board at sustained high temperature, with consequent cracking which not only contributes to passing excessive heat and hot gases through the test panel but also hastens the disintegration of the board under these adverse conditions.

2. Description of the Prior Art

To increase the fire resistant properties of gypsum products it has been conventional to introduce certain fibers and unexpanded vermiculite ore into the slurry of calcium sulfate hemihydrate (or calcined gypsum or gypsum stucco) and water during the board forming process. This concept is disclosed in U.S. Pat. Nos. 2,526,066; 2,681,863; 2,744,022; 2,803,575; 2,853,394; 3,454,456 and 3,616,173.

These patents basically teach the use of certain unexpanded vermiculite ores to offset the shrinkage of the board core during the heat exposure, the vermiculite ore expanding as the chemically combined water present in the gypsum is driven off. As this heating also tends to degrade the cohesiveness of the gypsum reducing the strength and integrity of the core, the special fiber component of the core formulation imparts a mechanical binding or matting effect to hold the calcining gypsum together and keep it from disintegrating and falling into the test furnace. Thus, U.S. Pat. No. 2,526,066 discloses increased resistance to the heat of a fire through the cooperative action of unexpected vermiculite and noncombustible fiber such as asbestos. U.S. Pat. No. 2,744,022 substitutes drawn textile glass fibers in the cooperating mixtures, and indicates that blown glass wool or mineral wool is unsatisfactory. The importance and the nature of the fiber portion of the cooperative mixtures is also stressed in U.S. Pat. No. 2,681,863, reporting that short strands of drawn textile fibers loosely bonded by a water soluble binder provide ready dispersibility of the fibers for individual distribution throughout the set gypsum core upon dissolution of the binder. This patent also indicates the unsuitability of blown glass wool or mineral wool for the fiber portion. In addition to the nature of the fiber, these patents also state that if such textile fibers are not present in recommended amounts, the core has a tendency to crack and break apart readily when exposed to severe heat. It also states that it is very difficult to incorporate into the core any amount even of the textile glass fibers which exceeds about 1.0 weight percent, because the fibers tend to mat together into clumps rather than dispersing uniformly in the aqueous slurry.

Further, U.S. Pat. No. 3,616,173 discloses that certain proportions of particular inorganic particles will further improve the fire resistant properties of board cores containing unexpanded vermiculite. Certain clays of less than 1 to about 40 micrometer (um) size and either colloidal silica or alumina of less than 1 micrometer size, or mixtures thereof, are alleged to provide some additional fire resistance. Also, U.S. Pat. No. 3,454,456 indicates that providing some proportion of the expanded perlite in the form of fine sized particles inhibits large surface fissuring and spalling on the board core. This patent calls for the use of an unexpanded vermiculite of a particle size which will pass through 50 U.S. Standard mesh sieve (297 um) and be retained upon a 140 mesh sieve (105 um) to accomplish low fire shrinkage and low spalling.

SUMMARY OF THE INVENTION

Despite the passage of time since issuance of the above patents and the continued great cost differential between drawn, or textile, glass fiber and blown glass or mineral wools, it does not appear that anyone has heretofore successfully added large quantities of blown glass or mineral wool into calcined gypsum slurries because of clumping and nondispersability of these fibers. An important aspect of the present invention is the discovery of a method for incorporating the blown wool into the calcined gypsum slurry which does not introduce extraneous or deleterious constituents or require expensive capital inventment for auxilliary equipment. It has now been found that blown glass or mineral wool may be blended with appropriate amounts of calcium sulfate, preferably a portion of the dry calcined gypsum constituent of the coard core formulation, in such a fashion that the individual wool fibers are coated with powdered calcium sulfate solids and form loose open nodules. In this form the blown wool is readily and accurately meterable into calcined gypsum slurries using conventional equipment and readily disperses throughout the aqueous slurry. Thus, it is an object of this invention to provide an improved fire resistant gypsum board and gypsum fireproofing formulations.

It is another object and advantage of this invention to provide fire resistant gypsum board core formulations that do not require vermiculite for fire resistance nor textile glass fibers to provide integrity to the core.

The objects of this invention are accomplished basically in the discovery that about 1 to about 5 weight % or more mineral wool may successfully substitute for the customary vermiculite ore in providing fire resistance features in a gypsum or gypsum board core formulation. At these usage levels, the blown mineral fibers also seem to provide enough reinforcement to replace the textile glass fibers generally required for board strength.

DESCRIPTION OF THE PREFERRED EMBODIMENTS

Figure 1:
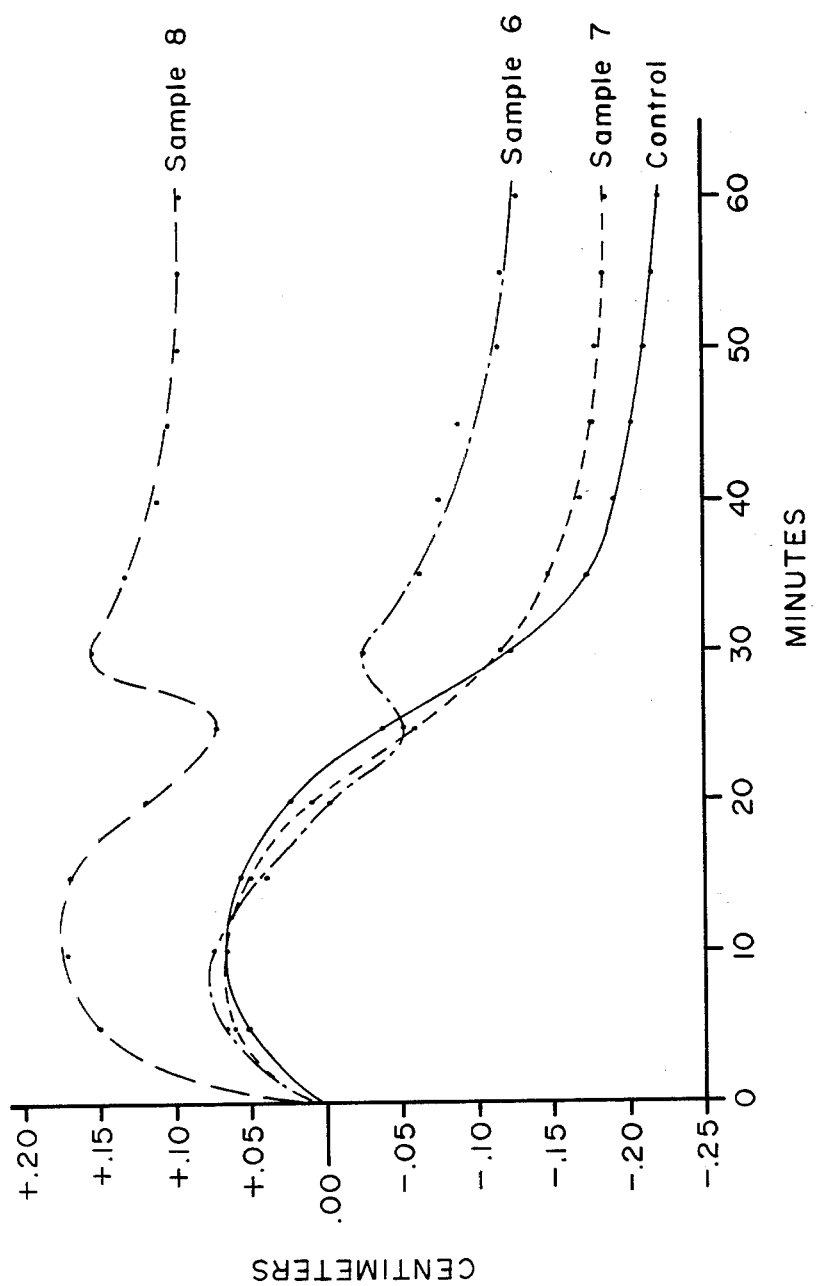
FIG. 1 presents a graphic representation of expansion and shrinkage curves of a control and various gypsum panels according to the invention during an hour long small scale fire test conducted in accordance with ASTM E-119.

The major ingredient of the board core composition of the invention is set gypsum, i.e. calcium sulfate dihydrate. It is formed by the hydration crystallization of calcined gypsum which has been slurried with water along with conventional additives according to the usual techniques. The calcined gypsum may be either alpha or beta hemihydrate, soluble anhydrite, or mixtures thereof, from natural or synthetic sources. Conventional additives may be added in customary amounts to the calcined gypsum formulations to impart desirable properties and to facilitate manufacturing, such as, for example, foaming agents, accelerating agents, retarding agents, dispersing agents, core adhesives, and mixtures thereof. In the manufacture of the gypsum wallboard, the core material is generally made by metering dry ingredients and water into a mixer and therein generating a foam to control the density of the resultant core material, such as by adding a dilute surface active foaming material solution to the mixer in proportions suitable to form a pourable aqueous slurry. The slurry is dispensed through one or more outlets at the bottom of the mixer onto a moving cover sheet, such as of a multi-ply paper. Another cover sheet is then placed on top of the slurry, so that the slurry is sandwiched between two moving cover sheets which become the facings of the resultant gypsum board. The thickness of the resultant board is controlled by a forming roll, and the edges of the board are formed by appropriate mechanical devices which continuously score, fold and glue the overlapping edges of the paper. Additional guides maintain thickness and width as the setting slurry travels on a moving belt. The board panels are cut, trimmed and passed to dryers to dry the set but still somewhat wet boards.

In accordance with the present invention, it has been found that improved fire resistant board is obtained when the core composition of typical gypsum wallboard comprises set calcined gypsum and about 1–5 preferable 2–3 weight percent blown wool. Plaster formulations for other uses such as steel beam column fireproofing may contain upwards to 10 weight percent or more of the blown wool. As used hereinafter and in the claims, the term "mineral wool" means glass or other mineral fibers prepared by attenuating a melt of glass, basalt, blast furnace slag or other vitreous mineral composition from the face of a heated centrifugal rotor and the like in contrast to textile fibers where the melt is drawn in linear fashion through heated orifices. In wool fiber production the melt is centrifugally thrown from the rotor and attenuated into fibers by encountering a tangential blast of air or hot gases thus imparting a slight curl or bend to the attenuated fibers. Wool fibers also tend to be more brittle than textile fiber.

Wool for use in the present invention will generally be stiff and of slightly bent or curled nature, and generally of about 2–8 $\mu$m diameters and highly variable lengths of from 0.15–11 cm, with lengths of 0.3–1.5 cm being preferred, although any commercially available mineral wools are suitable. Such fiber is further generally characterized in being commercially available in loose clumps or tufts from which it gets the name wool.

Further, for use in the present invention it is preferred that the wool be relatively free from adhered shot. It is also preferred that the wool be coated with a softening agent as a compounding aid. Suitable softening agents include any of the known cationic, anionic, nonionic or amphoteric fabric softening compounds, although quarternary ammonium compounds are presently preferred. A particularly preferred group of quarternary softening compounds are the diamidoamines with methyl sulfate anionic portions available under the trademark VARISOFT from Sherex Chemical Company. Use of such softeners appears to aid dispersability of the wool during dry blending of the wool and powdered calcium sulfate, and to aid wet dispersibility and lower water requirements of the blends in formulating aqueous calcined gypsum slurries.

An important aspect of the present invention is thoroughly coating the wool fibers with powdered calcium sulfate before adding the wool to the gypsum slurry. Preferably, about 1–10 parts by weight or more of calcium sulfate to each part by weight wool are blended together. The calcium sulfate may be a portion of the calcined gypsum used for the aqueous calcined gypsum slurry or any other added form of calcium sulfate. Such added form may be particulate, acicular or microfiber crystalline forms of dehydrated, partially hydrated, or fully hydrated calcium sulfate. Calcium sulfate anhydrite II is preferred and available as SNOW WHITE ® anhydrite filler about 7 $\mu$m average particle size, and the like particulate anhydrite fillers.

Uniform coating of the wool fibers with calcium sulfate is accomplished by a tumbling form of blending action which allows the calcium sulfate to penetrate the spaces between the individual fibers in the wool tufts and thereby obtain an open, loose nodule of coated fibers. In a preferred embodiment a twin shell blender was used to blend the wool and the calcium sulfate on a dry basis. The turning and tumbling action of this type of blender first coats the fibers with the sulfate solids and then breaks the fibers and forms loose nodules. The length of the broken fibers and the tightness of the nodules formed are a function of the length of time and intensity of the fluffing in the blending. The longer the blending time, the shorter the fiber length and the smaller and tighter the nodules formed. Also the smaller and tighter the nodules, the longer the mixing time in the slurry blender to get the nodules to open and disperse thoroughly in the aqueous calcined gypsum slurry systems with conventional mixing equipment. Any large, stirred blending vessel may be used to coat the wool. After blending, the coated wool is dispensed from the mixer onto a rotating feed screw or belt conveyor feeder to meter and convey the coated wool loose blend to the main stucco screw leading to the gypsum board slurry mixer.

The improved fire resistant products of this invention can be make without having to modify significantly the established processes for making gypsum board or formulated plaster compositions and without requiring any significant capital investment in non-conventional machinery or other equipment.

The following specific examples will further illustrate various specific emdobiments of the materials and the process of the present invention. All amounts are expressed as parts by weight unless specified to the contrary. Of course, it is to be understood that these examples are by way of illustration only and are not to be construed as limitations upon the present invention.

EXAMPLE 1

In a first series of evaluations, small gypsum board core slabs without cover sheets were made and tested for breaking load strengths in the laboratory.

For this evaluation, two different mineral wools were separately blended on laboratory scale equipment with a portion of the stucco to be used in the gypsum board formulation. Both mineral wools were obtained as fairly tight tufts of fibers averaging 7 um in diameter and about 5-8 cm in length. One of the wools was coated with methyl bis(tallowamidoethyl)2-hydroxyethyl ammonium sulfate softener. The wools were blended for 2-10 minutes with dry, powdery calcium sulfate (stucco) in proportions of 2 parts by weight of stucco and 1 part by weight of wool in a PATTERSON-KELLEY twin shell blender, with the intensifier bar operating to fluff the blending mixture and work the powdered stucco into the spaces between the individual wool fibers, and then either rubbed between the palms of the hand for a few seconds or passed through a BICO pulverizer to obtain loose, open, stucco-fiber concentrate modules. Various amounts of the concentrate nodules were formulated and cast into gypsum board core slabs using laboratory sized equipment. Because of the very brittle nature of blown wool, breakage of the fibers in the blender and slurry mixer resulted in wool lengths in the core of about 0.6 to about 1.3 cm, and further reduced the length when the pulverizer was used, to about 0.3-1 cm. The slabs were placed upon a Tinius Olsen testing apparatus and load was applied to the point of breaking. Representative results of breaking strength load applied as a measure of board core strength of various formulations was as follows:

| Core Additive | Breaking Load (kg) | % Change from control |
|---|---|---|
| Control-ordinary gypsum board core formulation | 10 | — |
| 0.3% textile glass fiber | 13 | 33% |
| 0.3% textile fiber 5% vermiculite ore | 11 | 19% |
| 1% wool in wool-stucco blend | 11 | |
| 2% wool in wool-stucco blend | 17 | 78% |
| 2% softener treated wool in wool-stucco blend | 13 | 33% |
| 2.5% softener treated wool in wool-stucco blend | 15 | 59% |

From the above it may be clearly seen that in general textile glass fibers improved the strength of a gypsum board slab, but the vermiculite conventionally added to impart improved fire resistive properties considerably weakened the board. Board slab strength comparable to a customary improved fire resistance formulation is accomplished with as low as 1% mineral wool by weight of the dry weight of total board core formulation and higher amounts of the stucco blended blown mineral wool provided higher core strengths.

EXAMPLE 2

In a second series of evaluations, several formulations were formed into nominal 1.3 cm thick, paper covered gypsum panels on a laboratory sized gypsum board forming line. No difficulties were experienced in incorporating various amounts of stucco-blended blown mineral wool concentrate nodules obtained as set forth in Example 1 into the paper covered gypsum panels. Small size pieces, measuring 15.3 cm by 25.5 cm, of the panels were then submitted to small scale fire testing.

For the small scale fire test, the board sample is placed vertically in front of a test furnace composed of fire brick and having a front plenum opening 0.635 cm larger than the board sample. The furnace is equipped with natural gas burners arranged so that the flames bathe the sample, rather than impinging upon particular spots of the sample, and so that the temperatures along the exposed face of the board sample will essentially be uniform. Temperatures within the furnace and on the exposed face of the sample are measured by thermocouples. In addition, the sample is restrained within the brackets of a spring strain gauge to measure the expansion and contraction of the sample during the one hour fire test. For each test the furnace temperature was held as close as possible to the same time-temperature curve. The furnace fire is started after the panel is set in place, and the temperature raised from ambient to 538° C.-593° C. over the first 5 minutes of the test, to 746° C.-755° C. at 10 minutes into the test, and maintained at about 755° C. for the remainder of the hour long test.

Normally, conventional gypsum board core formulations without any particular fire retardant additives undergo a thermal expansion of about 0.06 cm in the first 10 minutes of this test as the paper cover sheets burn off, and then start to shrink as the gypsum in the core calcines with maximum shrinkage in the first 40 minutes of the test. Integrity of the sample is measured by visual observation of the sample during and at the conclusion of the test.

Representative results of the fire testing with expansion (+) and shrinkage (−) values at 5 minute intervals throughout the hour long fire test were:

| Sample No. | Control | #1 | #2 | #3 | #4 | #5 |
|---|---|---|---|---|---|---|
| | Conventional | 1% wool | 2% wool | | 2.5% wool | 5% wool* |
| Formulation Additives | 5%/0.3% vermiculite glass fiber | 0.3% textile fibers | 0.3% textile fibers | 2.5% wool | 0.15% textile fiber | 0.3% textile fiber |
| time in minutes | | | | | | |
| 5 | .053 | .051 | .053 | .069 | .064 | .046 |
| 10 | .069 | .069 | .071 | .091 | .089 | .059 |
| 15 | .059 | .074 | .048 | .071 | .074 | .069 |
| 20 | .025 | .048 | .010 | .043 | .010 | .056 |

-continued

| Sample No. Formulation Additives | Control Conventional 5%/0.3% vermiculite glass fiber | #1 1% wool 0.3% textile fibers | #2 2% wool 0.3% textile fibers | #3 2.5% wool | #4 2.5% wool 0.15% textile fiber | #5 5% wool* 0.3% textile fiber |
|---|---|---|---|---|---|---|
| 25 | −.038 | −.008 | −.020 | .013 | −.018 | .013 |
| 30 | −.122 | −.028 | .056 | .051 | −.051 | −.117 |
| 35 | −.175 | −.081 | .064 | .071 | .071 | −.142 |
| 40 | −.191 | −.145 | .033 | −.081 | −.003 | −.145 |
| 45 | −.203 | −.183 | .046 | −.089 | −.041 | −.137 |
| 50 | −.211 | −.199 | .051 | −.094 | −.051 | −.140 |
| 55 | −.212 | −.203 | .051 | −.099 | −.056 | −.155 |
| 60 | −.224 | −.206 | .051 | −.102 | −.058 | −.158 |

*coated with VARISOFT 222 methyl bis(tallowamidoethyl)2-hydroxyethyly ammonium sulfate From the above it may be clearly seen that the various amounts of stucco blended mineral wool provided better fire resistant properties, in that there was less shrinkage during the small scale fire testing than with a conventional fire resistant board core formulation. Sample #2 with 2% by weight blown mineral wool blended with a portion of the stucco feed, was expansive except for a brief interval in the middle of the hour long test.

EXAMPLE 3

In a further series of evaluations, a portion of the stucco feed to a commercial sized gypsum wallboard forming line was diverted to a batch operated Patterson-Kelley Twin Shell blender. Aliquots of 4.5 kg blown mineral wool and 13.6 kg of diverted stucco were blended, with the intensifier bar operating, for 10 minutes to form a premix concentrate of open loose nodules of wool fibers coated with the hemihydrate. Various proportions of this concentrate were conveyed by a screw feeder to the main stucco screw, which feeds the gypsum slurry mixer. Various levels of well dispersed blown mineral wool were readily incorporated into the gypsum board slurry and the resultant boards were made without any mixing or board forming difficulties. Full sized gypsum panels, nominal 1.3 cm thick by 1.2 m wide and 3.6 m long were formed and dried.

In a second evaluation, proportions of 4.5 kg of VARISOFT 222 softener treated blown mineral wool and 13.6 kg of SNOW WHITE ® anhydrite II were blended and fed to the slurry mixer as described above. This resulted in adding well dispersed wool and calcium sulfate anhydrite II to full sized gypsum panel board cores without any mixing or board forming difficulties for sample #8.

Small samples were cut from the full size panels for small scale fire testing as described in Example 2. Representative results with expansion and shrinkage (−) values at 5 minute intervals throughout the hour long test were:

| Sample Additives | Control Conventional 5% vermiculite 0.3% textile glass fiber | #6 2% wool-stucco blend 0.15% textile glass fiber | #7 2% wool stucco blend | #8 2½% wool 7½% anhydrite & 0.3% glass fiber |
|---|---|---|---|---|
| time in minutes | | | | |
| 5 | .053 | .066 | .064 | .152 |
| 10 | .065 | .076 | .069 | .173 |
| 15 | .059 | .041 | .051 | .173 |
| 20 | .025 | 0 | .013 | .122 |
| 25 | −.038 | −.051 | −.056 | .071 |
| 30 | −.122 | −.025 | −.114 | .155 |

-continued

| Sample Additives | Control Conventional 5% vermiculite 0.3% textile glass fiber | #6 2% wool-stucco blend 0.15% textile glass fiber | #7 2% wool stucco blend | #8 2½% wool 7½% anhydrite & 0.3% glass fiber |
|---|---|---|---|---|
| 35 | −.175 | −.064 | −.147 | .132 |
| 40 | −.191 | −.074 | −.168 | .112 |
| 45 | −.203 | −.086 | −.175 | .104 |
| 50 | −.211 | −.112 | −.178 | .099 |
| 55 | −.212 | −.117 | −.183 | .097 |
| 60 | −.224 | −.127 | −.185 | .097 |

These results, graphically depicted in FIG. 1, clearly show the reduction in shrinkage with formulations of the present invention. Each of samples 6, 7 and 8 exhibited considerably less shrinkage than the control during the second half hour of the tests. Sample 8, although showing the typical dip in the curve as the paper burns off and the gypsum in the core calcines and shrinks, evidenced net expansion throughout the test. FIG. 1 also clearly shows an unusual double peak in expansion obtained in both sample #6 and #8. This seems to appear around 3% mineral wool content in the gypsum board core formulation, as it is present in the data of samples #3 and #4 also.

While the present invention has been described and exemplified with respect to certain embodiments, it is not limited thereto. Variations and modifications obvious to those skilled in the art may be made without departing from the spirit and scope of the present invention. For example, continuous twin shell blenders, such as the PATTERSON-KELLEY ZIG ZAG Blender and various other means to tumble, fluff and nodulate the blends of wool and calcium sulfate may be employed.

What is claimed is:

1. A gypsum composition suitable for forming the core of a gypsum board which will provide at least a one hour fire resistance rating by laboratory fire test, which comprises:
   the set solids from a calcined gypsum slurry having distributed therethrough about 1–5% by weight of mineral wool fibers.

2. The gypsum composition of claim 1 in which the mineral wool fibers are coated with calcium sulfate solids.

3. The gypsum composition of claim 1 which includes about 1–10 parts by weight of calcium sulfate solids per each part by weight of wool fibers.

4. The gypsum composition of claim 1 in which the composition includes about 1–5% by weight of mineral wool fibers and 1-10 parts by weight of calcium sulfate anhydrite II per each part by weight of wool fibers.

5. The gypsum composition of claim 1 in which the set solids include textile glass fiber.

6. A plaster blend composition suitable for forming fire resistant gypsum compositions, which comprises calcined gypsum plaster and about 1-10% mineral wool fibers distributed therethrough resultant from blending about 1-10 parts by weight of calcium sulfate per each part by weight of wool fibers.

7. The plaster blend composition of claim 6 in which the calcium sulfate is calcium sulfate hemihydrate.

8. The plaster blend composition of claim 6 in which the calcium sulfate is calcium sulfate anhydrite II.

9. The plaster blend composition of claim 6 in which the calcium sulfate is calcium sulfate soluble anhydrite.

10. A method of forming a fiber reinforced and fire resistant gypsum board wherein a quantity of a mineral fiber is added to a calcined gypsum slurry, the improvement comprising:

tumbling together wool fiber and about 1-10 parts by weight of calcium sulfate per each part by weight of wool to form a blend of wool and calcium sulfate feeding the blend to a gypsum board slurry mixer and mixing about 1-5% by weight of wool with water and calcined gypsum to form a slurry; and feeding the slurry to a gypsum board forming line and forming a gypsum board having a core of casty gypsum containing about 1-5% by weight of wool fiber dispersed throughout the core.

11. The method of claim 10 in which the wool is tumbled to form a blend with calcined calcium sulfate.

12. The method of claim 10 in which a portion of the calcined gypsum feed to the slurry mixer is diverted, tumbled with the wool, and then fed to the slurry mixer.

13. The method of claim 10 in which the wool is tumbled to form a blend with calcium sulfate anhydrite II.

14. The method of claim 10 in which the wool is coated with a quarternary ammonium compound before blending it with calcium sulfate.

15. The method of claim 10 in which about 2% by weight blown mineral wool is tumbled and blended with about 7% calcium sulfate anhydrite II, and fed to the slurry mixer.

16. An article for use in manufacture consisting essentially of an intimate, intersticial mixture of nodules of blown mineral wool fibers coated with powdered calcium sulfate solids.

17. The article of claim 16 wherein the weight ratio of calcium sulfate to wool fibers is about 1-10 parts by weight of calcium sulfate to each part by weight of wool fibers.

18. The article of claim 16 in which said calcium sulfate is anhydrite.

19. The article of claim 16 in which said calcium sulfate is hemihydrate.

20. The article of claim 16 in which said calcium sulfate is dihydrate.

21. The article of claim 16 in which said wool fibers are coated with a softening agent.

22. The article of claim 16 in which said wool fibers are coated with a quaternary ammonium softening agent.

23. The article of claim 16 in which said wool fibers are coated with a diamidoamine quaternary ammonium softening agent.

24. A process of manufacturing an intimate, intersticial mixture of nodules of blown mineral wool fibers and calcium sulfate comprising a tumbling blending of blown mineral wool with calcium sulfate sufficient to coat the wool fibers with powdered calcium sulfate.

25. The process of claim 23 in which the wool fibers are blended with about 1-10 parts by weight of calcium sulfate for each part by weight of wool fibers.

26. The process of claim 23 in which the wool fibers are coated with a softening agent.

27. The process of claim 23 in which the wool fibers are coated with a diamidoamine quaternary ammonium softening agent.

* * * * *